United States Patent
Lain (10) Patent No.: US 10,621,487 B2
(45) Date of Patent: Apr. 14, 2020

(54) NEURAL NETWORK VERIFICATION

(71) Applicant: Hewlett Packard Enterprise Development LP, Houston, TX (US)

(72) Inventor: Antonio Lain, Menlo Park, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 577 days.

(21) Appl. No.: 15/327,776

(22) PCT Filed: Sep. 17, 2014

(86) PCT No.: PCT/US2014/056088
§ 371 (c)(1),
(2) Date: Jan. 20, 2017

(87) PCT Pub. No.: WO2016/043734
PCT Pub. Date: Mar. 24, 2016

(65) Prior Publication Data
US 2017/0206449 A1    Jul. 20, 2017

(51) Int. Cl.
*G06N 3/04* (2006.01)
*G06N 3/02* (2006.01)
*G06N 3/08* (2006.01)

(52) U.S. Cl.
CPC ............... *G06N 3/04* (2013.01); *G06N 3/02* (2013.01); *G06N 3/08* (2013.01)

(58) Field of Classification Search
CPC .............. G06N 3/02; G06N 3/04; G06N 3/08
See application file for complete search history.

(56) References Cited

U.S. PATENT DOCUMENTS

| 5,720,003 A * | 2/1998 | Chiang ............... H04L 41/0681 706/21 |
| 6,625,780 B1 | 9/2003 | Charbon et al. |
| 7,035,427 B2 | 4/2006 | Rhoads |
| 8,306,932 B2 | 11/2012 | Saxena et al. |

(Continued)

OTHER PUBLICATIONS

Mann et. al., "N2Sky—Neural Networks as Services in the Clouds", Jan. 10, 2014 (Year: 2014).*

(Continued)

*Primary Examiner* — Li B. Zhen
*Assistant Examiner* — Selene A. Haedi
(74) *Attorney, Agent, or Firm* — Hewlett Packard Enterprise Patent Department (57) ABSTRACT

Systems and methods associated with neural network verification are disclosed. One example method may be embodied on a non-transitory computer-readable medium storing computer-executable instructions. The instructions, when executed by a computer, may cause the computer to train a neural network with a training data set to perform a predefined task. The instructions may also cause the computer to train the neural network with a sentinel data set. The sentinel data set may cause the neural network to provide an identification signal in response to a predefined query set. The instructions may also cause the computer to verify whether a suspicious service operates an unauthorized copy of the neural network. The suspicious service may be verified by extracting the identification signal from responses the suspicious service provides to the predefined query set.

12 Claims, 8 Drawing Sheets

(56) References Cited

U.S. PATENT DOCUMENTS

| | | |
|---|---|---|
| 8,311,967 B1 | 11/2012 | Lin et al. |
| 2004/0117644 A1* | 6/2004 | Colvin ................. G06F 21/121 |
| | | 713/193 |
| 2008/0118161 A1 | 5/2008 | Liu et al. |
| 2009/0281974 A1* | 11/2009 | Saxena ............... G06N 3/0427 |
| | | 706/14 |
| 2010/0082627 A1 | 4/2010 | Lai |
| 2011/0119209 A1 | 5/2011 | Kirshenbaum et al. |
| 2014/0165210 A1 | 6/2014 | Collberg et al. |
| 2015/0055855 A1* | 2/2015 | Rodriguez ............. G06F 21/16 |
| | | 382/159 |
| 2015/0200782 A1* | 7/2015 | Horne .................... G06F 21/16 |
| | | 713/189 |

OTHER PUBLICATIONS

Du, J. et al ~ "BSS: a new approach for watermark attack" ~ Multimedia Software Engineering, 2002. Proc. Fourth Int'l Symposium ~ 2002 ~ 2 pages.

International Searching Authority, The International Search Report and the Written Opinion, dated May 26, 2015, 9 Pages.

Sang, J. et al, "A Neural Network Based Lossless Digital Image Watermarking in the Spatial Domain"—Advances in Neural Networks Lecture Notes in Computer Science V 3497, 2005, 772-776.

\* cited by examiner

NEURAL NETWORK VERIFICATION

BACKGROUND

Neural networks are computing tools used in, for example, machine learning and pattern recognition applications. A neural network includes a set of interconnected nodes that process inputs to generate an output based on weighting functions in the nodes. Some neural networks are developed by training the neural network based on a set of training data that is designed to teach the neural network to perform a predefined task. By way of illustration, a neural network designed to differentiate between types of animals sown in images may be trained using a training data set containing images of animals that have been pre-classified (e.g., by a person). Based on the training data set, the neural network may be able to identify different features of images containing different types of animals so that when an unclassified image is shown to the neural network, the neural network can attempt to identify an animal shown in the unclassified image.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems and methods associated with neural network verification are described. In various examples, neural networks may be verified by embedding a watermark within the neural network that causes the neural network to respond to a known set of queries in a predefined manner. In one example, it may be possible to insert the watermark by embedding the watermark into weights the neural network uses to make its decisions (e.g., by ensuring that certain bits of the weights have known values). In another example, the neural network may be trained, via a process similar to the process the neural network is trained to perform its predefined task, to respond to the known set of queries in the predefined manner. Training the watermark into the neural network, as opposed embedding the watermark may be easier to detect because detecting an embedded watermark may require access to the weights used by neural networks suspected to be unauthorized copies of the watermarked neural network. For example, if a neural network with an embedded watermark is copied and placed behind a secured network (e.g., providing access via queries or an API), legal action may be required to determine whether a suspicious neural is an unauthorized copy of the neural network. Additionally, modifying a trained neural network, to attempt to remove a watermark may be more likely to degrade performance of the neural network than an embedded watermark, thereby deterring modification of the trained neural network.

Figure 1:
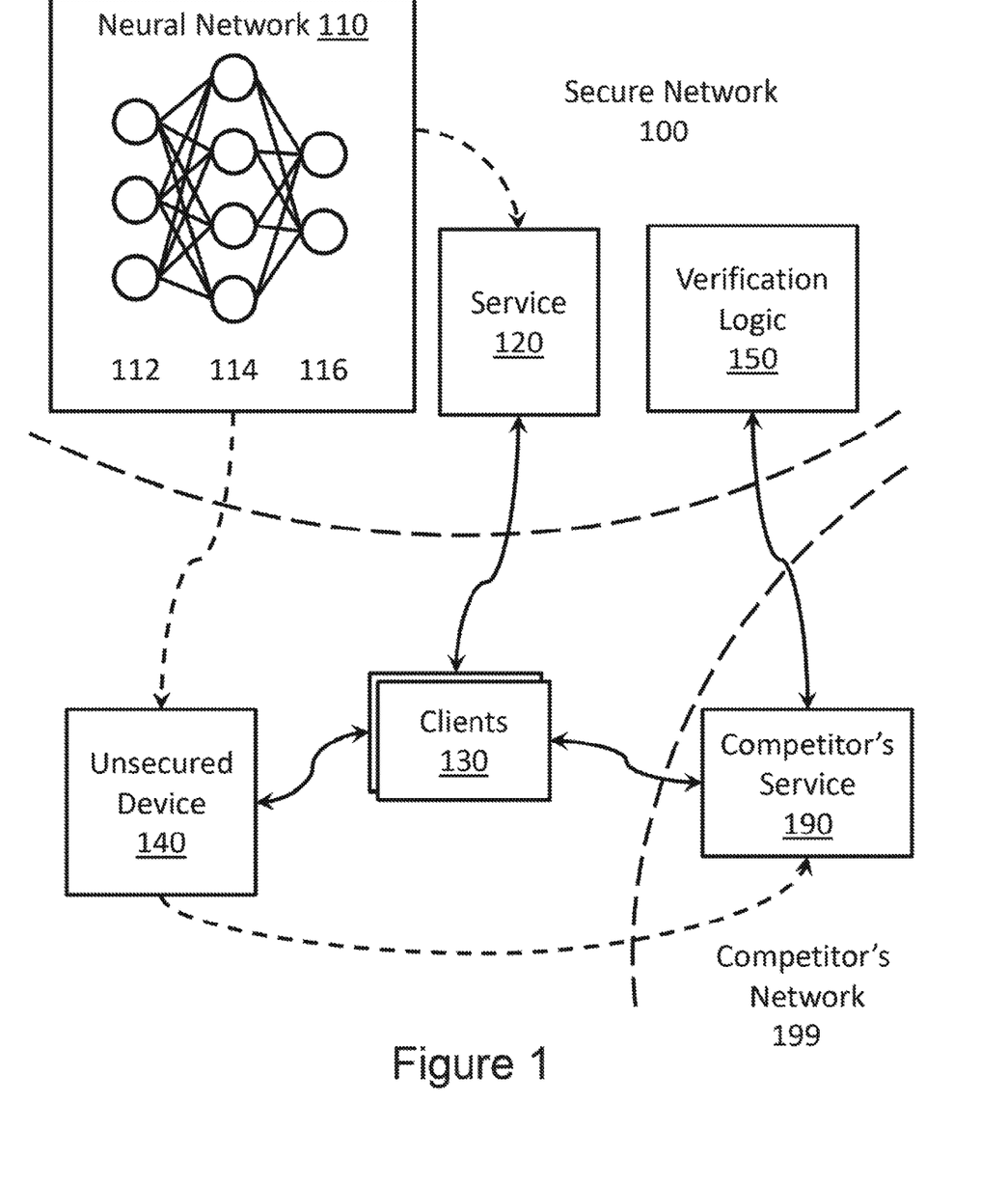
FIG. 1 illustrates an example sec network which example is and methods, and equivalents may operate.

FIG. 1 illustrates an example secure network 100 in which example systems and methods, and equivalents may operate. It should be appreciated that secure network 100 is an illustrative example and many different network designs may be appropriate. Secure network 100 includes a neural network 110. Neural network 110 may be designed to perform a predefined task. The predefined task may be, for example, related to machine learning, pattern matching, and so forth. Some example real world tasks performed by the neural networks include, image identification (e.g., identifying what type of animal is depicted in an image), recognizing handwritten text, and so forth.

Neural network 110 may include input nodes 112, processing nodes 114 and output nodes 116. Input nodes 112 may process inputs of the type neural network 110 is designed to operate on and generate data usable by processing nodes 114. Processing nodes 114, by virtue of being trained, may interpret the data and begin to formulate a response to the input and activate output nodes 116 which may provide an appropriate response to the query. By way of illustration, a neural network 110 trained to identify handwritten characters may have its input nodes 112 activated when it is presented with pixel values in an input image. These input nodes 112 may apply various functions to the pixels and send the results of applying the functions to processing nodes 114 which may weight the results and/or apply further functions. Other processing nodes 114 and/or output nodes 116 may continue this process until an output node 116 is activated identifying which character was read. Though neural network 110 is illustrated as having 3 layers and 9 nodes, neural network 110 may have several other nodes and/or layers depending on how neural network 110 is designed to complete the predefined task.

Prior to the operation of neural network 110, neural network 110 may be trained to perform the predefined task. The training may involve supervised learning, unsupervised learning, reinforcement learning and so forth. In one example, training neural network 110 may involve identifying an optimization function that judges neural network 110 as it makes decisions based on a training data set, allowing neural network 110 to modify the functions and weights of its various nodes (e.g., input nodes 112, processing nodes 114, output nodes 116) to provide outputs that achieve a higher score in the optimization function. In another example, neural network 110 may modify the weights and functions by correlating attributes of inputs from a training data set based on whether it correctly identifies or responds to an input.

Training neural network 110 may be a complex and computationally intensive process when compared to operating neural network 110. This may be because it takes a relatively long time to train neural network 110 with a sufficient number of inputs to ensure neural network 110 is likely to provide an accurate output in response to a given input, when compared to providing an input and receiving a response once neural network has already been trained.

Consequently, to prevent leaking the details of how neural network 110 was trained, neural network 110 may be made accessible to clients 130 by embedding neural network 110 in a service 120 within secure network 100. Though this may make it difficult for a competitor or adversary to copy an instance of neural network 110, providing access to neural network 110 via service 120 within secure network 100 may also make it difficult for clients 130 to access neural network 110 when service 120 is offline or inaccessible due to network difficulties. Additionally, because clients 130 access service 120 remotely, response times of service 120 may be slower than if neural network 110 is accessible to clients 130 more locally to clients 130.

Instead, access to neural network 110 may be provided to clients 130 via an unsecured device 140. Unsecured device 140 may be, for example, a computer operating a service similar to service 120. Alternatively, unsecured device 140 may be a clients personal device (e.g., cellular phone, personal computer) onto which the client may install an application containing an instance of neural network 110.

However, making neural network 110 accessible outside of secure network 100 may allow neural network 110 or a process operating based on neural network 110 to be copied and run in competition with neural network 110. By way of illustration, a copy of neural network 110 may be run as a competitors service 190 inside of the competitor's network 199. Because direct access to competitor's service 190 may be unavailable, it may be difficult to verify whether the competitor's service operates based on an unauthorized copy of neural network 110.

Consequently, a watermark may be trained into neural network 110 to facilitate detection of unauthorized copies of neural network 110. The watermark may cause neural network 110 to respond to a predefined query set with an identification signal. Thus, in addition to training neural network 110 with a training data set that configures neural network 110 to perform its predefined task, neural network 110 may be trained with a sentinel data set that embeds the watermark into neural network 110. The sentinel data set may comprise random inputs of the same type as the training set. Inputs of the same type might mean, for example the random inputs are images when neural network 110 performs an image processing function, or text when neural network 110 is designed to respond to text based queries.

The sentinel data comprising random inputs may ensure that the inputs do not correlate with the training data set, which could cause degradation of the quality of the primary function of neural network 110. For an image processing function, a random input may be, for example, an image that if viewed by a person would appear to be randomly colored pixels. For a text processing function, a random input may be, for example, a string of random characters. Other inputs in the sentinel data set may vary depending on the function of neural network 110. In some cases, the topology of neural network 110 may need to be designed to accommodate the sentinel data set to prevent the sentinel data set from inadvertently degrading the quality of responses neural network 110 provides to legitimate queries.

Training the neural network may also include enhancing the identification signal with an error correcting code. Incorporating the error correcting code may inhibit modifications to an unauthorized copy of neural network 110 from causing the unauthorized copy to provide a non-matching identification signal in response to the predefined query set. In one example, the error correcting code may inhibit these modifications by forcing the modifications to the unauthorized copy to be substantial enough that they degrade performance of the unauthorized copy at the predefined task.

Once neural network 110 has been trained, access to neural network 110 may be provided to clients 130 via, for example, unsecured device 140. If the competitor makes an unauthorized copy of neural network 110 and operates the unauthorized copy from competitors service 190, the unauthorized copy of neural network 110 may be detectible by providing competitor's service 190 the predefined query set, and extracting the identification signal from responses the competitor's service provides to the predefined query set. In this example, a verification logic 150 inside secure network 100 may extract the identification signals from competitor's service 190.

In an alternative example, a verification logic may be operated by a trusted third party (not shown). The trusted third party may be an agreed upon party whose role is to verify whether neural networks that perform similar functions have been copied. So that the trusted third party can perform its function, access to neural network 110 (e.g., via service 120, via unsecured device 140), the predefined query set, and the identification signal may be provided to the trusted third party. The trusted third party may then determine whether neural network 110, the predefined query set, and/or the identification signal conflict with previously submitted neural networks, query sets, and/or identification signals.

By way of illustration, neural network 110 may conflict with an earlier neural network if neural network 110 responds to a query set associated with the earlier neural network with an identification signal associated with the earlier neural network. The predefined query set and/or the identification signal may conflict with an earlier neural network if the earlier neural network responds to the predefined query set with the identification signal. Testing for other conflicts may also be appropriate.

When no conflicts are detected, the trusted third party may approve operation of neural network 110 once the trusted third party ensures that neural network 110 responds to the predefined query set with the identification signal to make sure neural network 110 behaves as described. The trusted third party may also confirm when other neural networks test positive against the predefined query set and the identification. In one example, the trusted third party may test services identified by the operator of neural network 110 as running an unauthorized copy of neural network 110. Thus, when a suspicious neural network is detected (e.g., competitor's service 190), verification logic 150 may initially test whether the suspicious neural network is operating as an unauthorized copy of neural network 110. If the suspicious neural network tests positive, the trusted third party may then be alerted, and then run their own verification logic against the suspicious neural network to confirm whether the suspicious neural network operates as an unauthorized copy of neural network 110.

In general, the entire watermarking process described herein may be useful to an operator of neural network 110 that wants to provide offline access to neural network 110 (e.g., via an unsecured device 140 instead of via a service 120 within a secure network 100) while still preventing competitors from copying neural network 110 and providing access via the competitor's service 190. By extracting the identification signal from responses competitor's service 190 provides to the predefined query set, evidence of the copying may be obtained both against the competitor and potentially against an entity (e.g., person, company, device) that facilitated creation of the unauthorized copy of neural network 110. This may allow the appropriate remedial action to be taken (e.g. termination of services, legal action, public relations actions) against the competitor and/or the entity that facilitated creation of the unauthorized copy of neural network 110.

In another example, may be appropriate to train neural network 110 using several different sentinel data sets to generate copies of neural network 110 that respond to potentially differing predefined query sets with differing identification signals. These copies may then be embedded in to different unsecured devices 140 If competitor's service 190 responds to one of these predefined query sets with the appropriate identification signal, it may be possible to identify which unsecured device 140 the unauthorized copy of neural network 110 was copied from. This may allow an operator of neural network 110 to take an appropriate action against the user of the unsecured device 140 from which the unauthorized copy of neural network 110 was created. In one example, it may be efficient for the predefined query sets to be the same, and each copy of neural network 110 be configured to respond with differing identification signals. In other situations it may be appropriate for each copy neural network 110 to respond to differing query sets with differing identification signals, or for certain subsets of the copies of neural network 110 to respond to certain predefined query sets.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
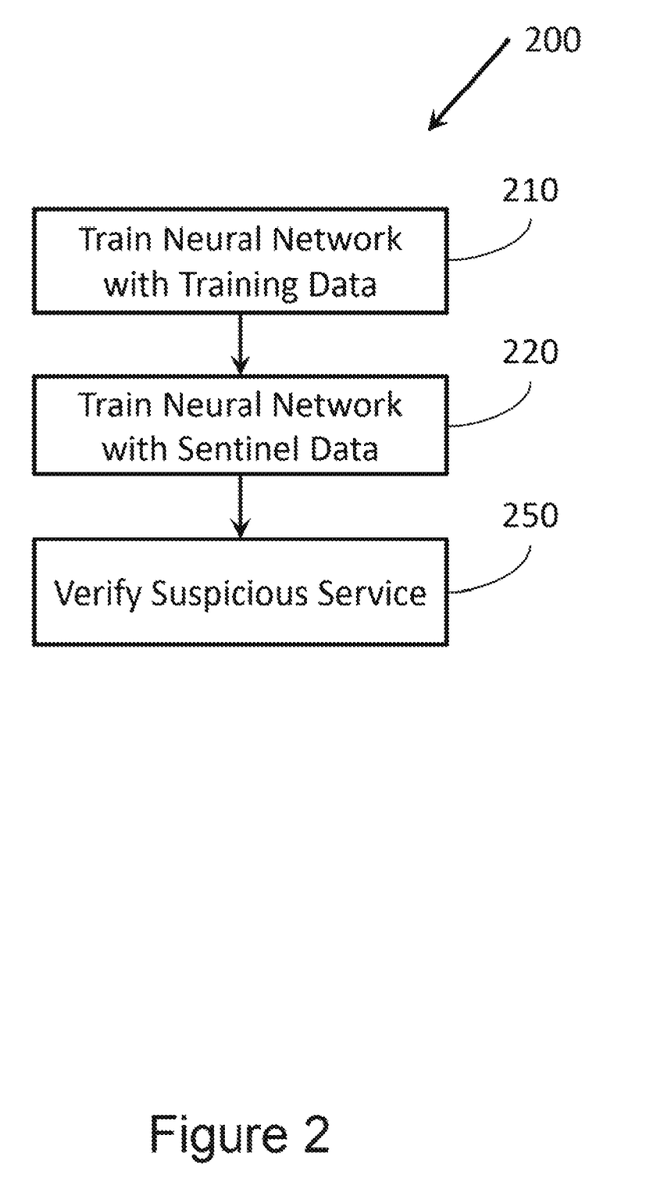
FIG. 2 illustrates a flowchart of example operation associated with neural network verification.

FIG. 2 illustrates a method 200 associated with neural network verification. Method 200 may be embodied on a non-transitory computer-readable medium storing computer-executable instructions. The instructions, when executed by a computer may cause the computer to perform method 200. Method 200 includes training a neural network with a training data set at 210. The training data set may be configured to train the neural network to perform a predefined task. The predefined task may be related to, for example, image identification, handwriting identification, text analysis, and so forth.

Method 200 also includes training the neural network with a sentinel data set at 220. The sentinel data set may cause the neural network to provide an identification signal in response to a predefined query set. Thus, the sentinel data set may effectively embed a watermark in the neural network that causes the neural network to respond in a specified manner to specific inputs. In some cases, the neural network topology may need to be designed to accommodate the sentinel data set to prevent under-fitting the neural network. An under-fitted neural network may not perform the predefined task as well as a network that has an appropriately sized topology. Consequently, compared to a topology of a neural network that is not trained by the sentinel data set, the neural network operated on by method 200 may be designed to have, for example, differing numbers of weights, layers, nodes, and so forth.

In one example, the sentinel data set may be uncorrelated with the training data set. This means that though inputs associated with the training data set and the sentinel data set may share a similar format (e.g., image, text, video), the inputs associated with the sentinel data set may be unrelated to the sentinel data set. By way of illustration, a neural network trained at action 210 to differentiate between different types of animals based on images of the animals may be programmed with a sentinel data set of images unrelated to animals. In one example, the sentinel data set may comprise randomly generated inputs. Consequently, in the example where the neural network is trained to differentiate between animals, the randomly generated inputs, if viewed by a person, may appear to be images of randomly colored pixels. In an example where the neural network is trained to respond to textual queries, the randomly generated inputs may be random strings of characters.

Method 200 also includes verifying whether a suspicious service operates an unauthorized copy of the neural network at 250. The suspicious service may be verified by extracting the identification signal from responses the suspicious service provides to the predefined query set. If the predefined query set is a single query, the identification signal may be provided in the response the suspicious service provides to that single query. Where the predefined query set contains multiple queries, the identification sign ay comprise portion of the responses suspicious service provides to the queries.

In one example, extracting the identification signal comprises hiding the predefined query set within a masking query set. Hiding the predefined query set within the masking query set may prevent an operator of the suspicious service from identifying the predefined query set, the identification signal, and so forth. Preventing the operator from identifying the predefined query set and/or the identification signal may make it more difficult for the operator to provide a signal other than the identification signal when the suspicious service is responding to the predefined query set. Additionally, if the operator does not know the predefined query set and/or the identification signal, it may be difficult for the operator to block the suspicious neural network from receiving and/or responding to the predefined query set.

It should be appreciated that many actions of method 200, and other methods disclosed herein, may be performed substantially in parallel despite their illustrations in the various figures. For example, in method 200, training the neural network with training data at 210 and training the neural network with the sentinel data at 220 may occur at substantially the same time.

Figure 3:
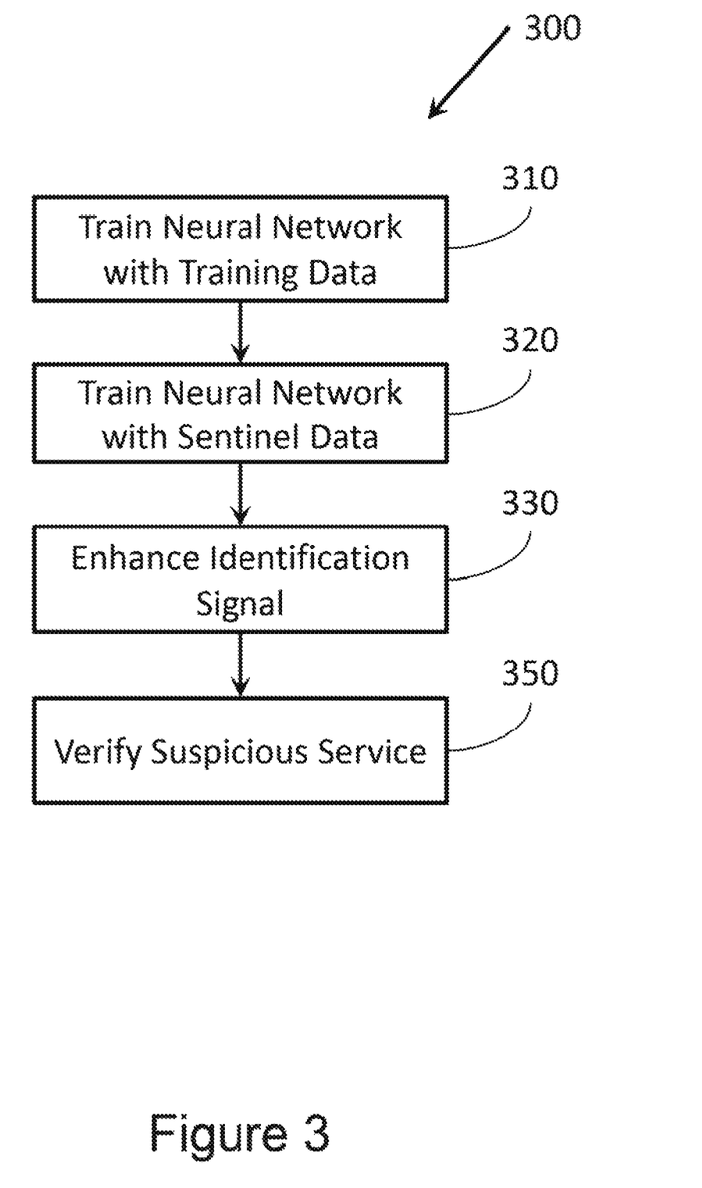
FIG. 3 illustrates another flowchart of example operations associated with neural network verification.

FIG. 3 illustrates a method 300 associated with neural network verification. Method 300 includes several actions similar those described above with reference to method 200 (FIG. 2). For example, method 300 includes training a neural network with training data at 310, training the neural network with sentinel data at 320, and verifying a suspicious service at 350.

Method 300 also includes enhancing the identification signal with an error correcting code at 330. The error correcting code may inhibit modifications to the unauthorized copy of the neural network from causing the suspicious service to provide a non-matching identification signal in response to the predefined query set. Consequently, the error correction code may inhibit modifications by causing the modifications to degrade performance of the unauthorized copy of the neural network at the predefined task.

Figure 4:
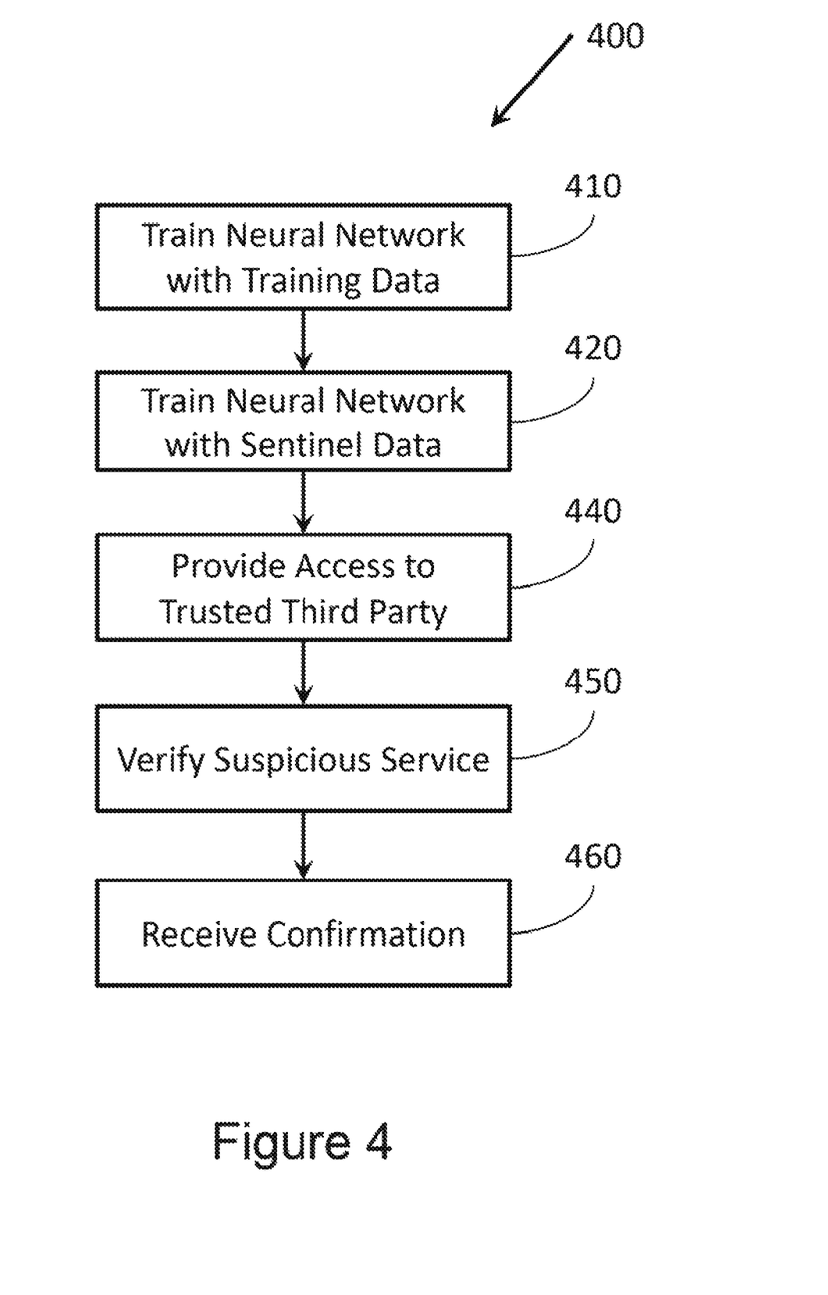
FIG. 4 illustrates another flowchart of example operations associated with neural network verification.

FIG. 4 illustrates a method 400 associated with neural network verification. Method 400 includes several actions similar to those described above with reference to method 200 (FIG. 2). For example, method 400 includes training a neural network with training data at 410, training the neural network with sentinel data at 420, and verifying the suspicious service at 450.

Method 400 also includes providing the predefined query set, the identification signal, and access to the neural network to a trusted third party at 440. In one example, a copy of the neural network may be provided to the trusted third party. In another example, access to a service operating a copy of the neural network may be provided to the trusted third party. The trusted third party may then confirm whether the predefined query set, the identification signal, and the neural network conflict with an archived query set, an archived identification signal, and an archived neural network. If any conflicts are found, it may be necessary to, for example, retrain the neural network to provide different identification signals in response to the predefined query set, change the predefined query set, and so forth.

Method 400 also includes receiving a confirmation from the trusted third party at 460. The trusted third party may provide the confirmation when the trusted third party determines the suspicious service operates the unauthorized copy of the neural network. The trusted third party may verify whether the suspicious service operates the unauthorized copy of the neural network by extracting the identification signal from responses the suspicious neural network provides to the predefined query set. Using the trusted third party model may allow a large number of neural network operators to ensure that their neural networks are not stolen by other neural network operators.

Figure 5:
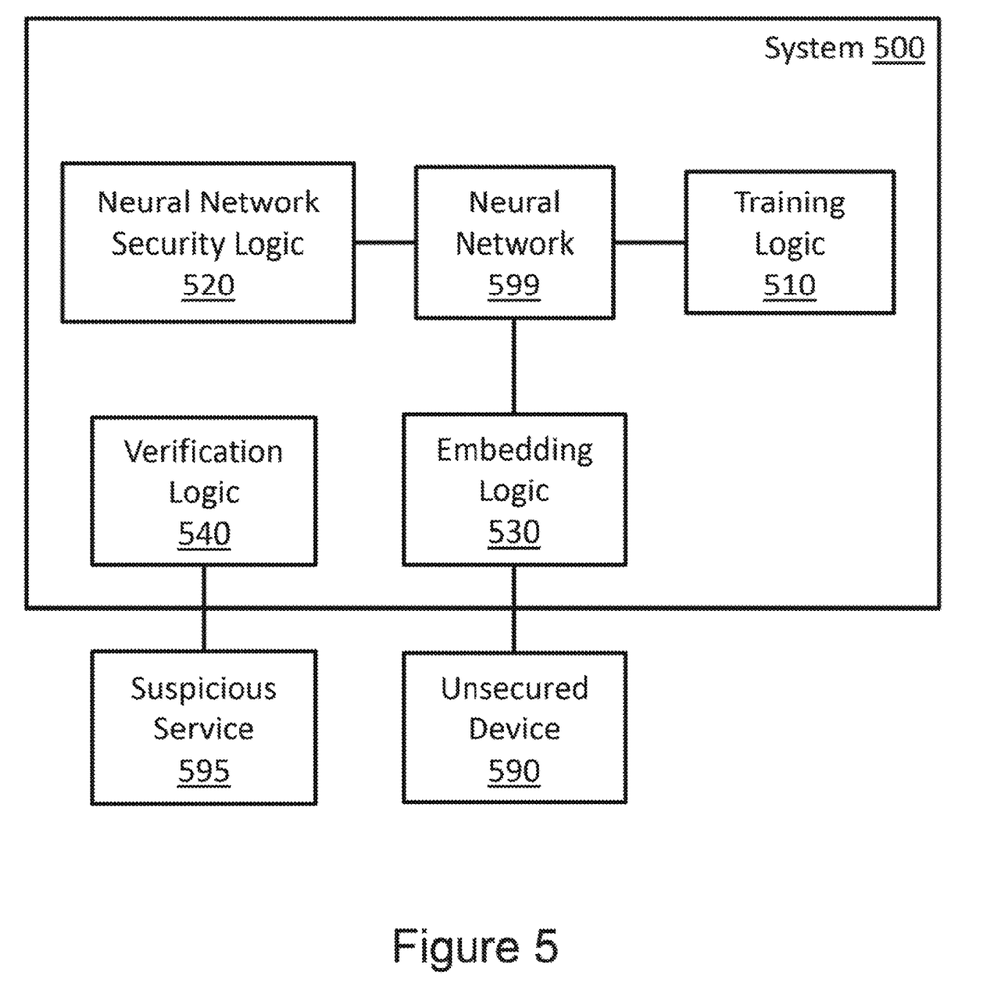
FIG. 5 illustrates an example system associated with neural network verification.

FIG. 5 illustrates system 500. System 500 includes a training logic 510 to train a neural network 599 according to a training data set. Though neural network 599 is illustrated as a component of system 500 in this example, in other examples, neural network 599 may operate outside the context of system 500. Training logic 510 may train neural network 599 to perform a predefined task. The predefined task may involve, for example, image analysis, text analysis, and so forth.

System 500 also includes a neural network security logic 520. Neural network security logic 520 may train neural network 599 according to a first sentinel data set. Training neural network 599 according to the first sentinel data set may create a first secured neural network. The first sentinel data set may cause the first secured neural network to provide a first identification signal in response to a first predefined query set.

System 500 also includes an embedding logic 530. Embedding logic 530 may embed the first secured neural network into a first unsecured device 590. The unsecured device may be, for example, a device associated with a user, a server associated with a company, and so forth. Embedding first secured neural network into a device associated with a user may include, for example, allowing the user to install an app containing the first secured neural network onto the user's cellular phone. Embedding the first secured neural network into a server associated with a company may include selling the company a server appliance that operates the first secured neural network.

Embedding the first secured neural network into first unsecured device 590 may allow unsecured device 590 to operate outside of a secure network into which system 500 may be incorporated. This may allow users of unsecured device 590 to access the first secured neural network when access to the secure network is otherwise unavailable. For example, if neural network 599 responds to text based queries, users of the neural network may not be able to access neural network 599 if they are without internet access. However, if the first secured neural network operates on the users' devices, the users may access neural network 599 when a network connection is unavailable.

System 500 also includes a verification logic 540. Verification logic 540 may identify whether a suspicious service 595 operates an unauthorized copy of the neural network by extracting the first identification signal from response suspicious service 595 provides to the first predefined query set. Thus, verification logic 540 may query suspicious services with the first predefined query set, to see if the suspicious service provides the first identification signal.

In one example, neural network security logic 520 may also train neural network 599 according to a second sentinel data set. This may create a second secured neural network. The second sentinel data set may cause the second secured neural network to provide a second identification signal in response to a second predefined query set. Embedding logic 530 may then embed the second secured neural network into a second unsecured device (not shown). Consequently, verification logic 540 may identify whether suspicious service 595 operates the unauthorized copy of neural network 599 by the second identification signal in a response suspicious service 595 provides to the second) predefined query set. In one example, the second sentinel data set and the first sentinel data set may be the same sentinel data set, and the first and second secured neural networks may be configured to respond to this same sentinel data set with differing identification signals.

When suspicious service 595 provides the first identification signal in response to the first predefined query set, this may indicate the unauthorized copy of neural network 599 was copied from first unsecured device 590. When suspicious service 595 provides the second identification signal in response to the second predefined query set, this may indicate unauthorized copy of the neural network 599 was copied from the second unsecured device. In one example, first unsecured device 590 and the second unsecured device may be associated with specific persons, instances of a service, companies, and so forth. Based on which identification signal is responded to, the source of the unauthorized copy of neural network 599 may be identified, allowing the appropriate action to be taken to prevent further unauthorized copies from being created. These actions may include, for example, a suspension of services, legal action, and so forth.

Figure 6:
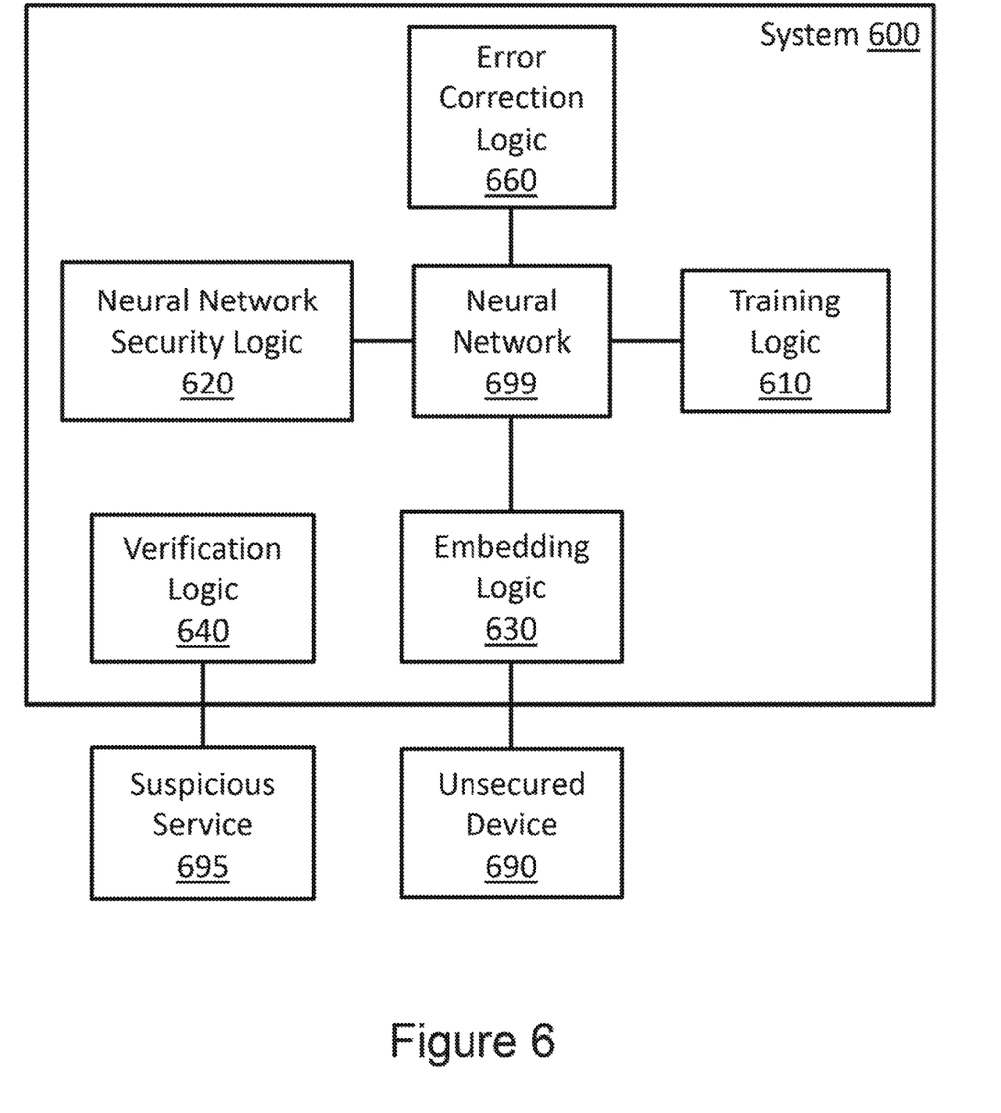
FIG. 6 illustrates another example system associated with neural network verification.

FIG. 6 illustrates a system 600 associated with neural network verification. System 600 includes several items similar to those described above with reference to system 500 (FIG. 5). For example, system 600 includes a training logic 610 to train a neural network 699 to perform a predefined task, a neural network security logic 620 to generate a first secured neural network, an embedding logic 630 to embed the first secured neural network into an unsecured device 690, and a verification logic 640 to determine whether a suspicious service operates an unauthorized copy of neural network 699.

System 600 also includes an error correction logic 660. Error correction logic 660 may embed an error correcting code into the identification signals of the first secured neural network. The error correcting code inhibits modifications to the unauthorized copy of the neural network that would affect the provision of the first identification signal in response to the first predefined query set. As described above, the error correcting code may ensure that modifications to the unauthorized copy of neural network 699 that are sufficient to affect the provision of the first identification signal will also be sufficient to degrade the quality of responses the unauthorized copy of neural network 699 provides when responding to legitimate queries associated with the predefined task.

Figure 7:
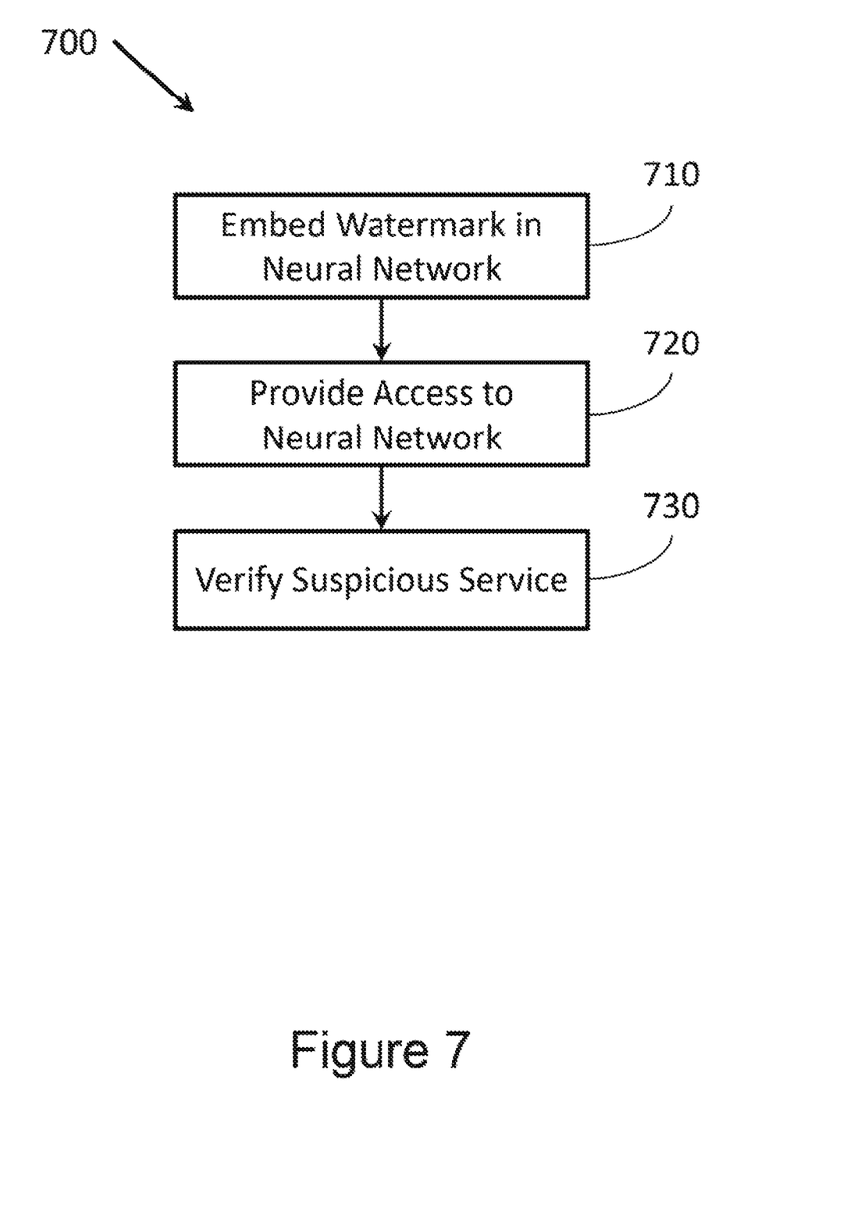
FIG. 7 illustrates another flowchart of example operations associated with neural network verification.

FIG. 7 illustrates a method 700 associated with neural network verification. Method 700 includes embedding a watermark in a neural network at 710. The watermark may be embedded using a sentinel data set. The watermark may cause the neural network to respond to a predefined query set with an identification signal.

Method 700 also includes providing access to the neural network at 720. Access to the neural network may be provided by embedding the neural network in an unsecured device.

Method 700 also includes verifying whether a suspicious service is an unauthorized copy of the neural network at 730. This may be verified by determining whether the suspicious service provides the identification signal in response to the predefined query set.

Figure 8:
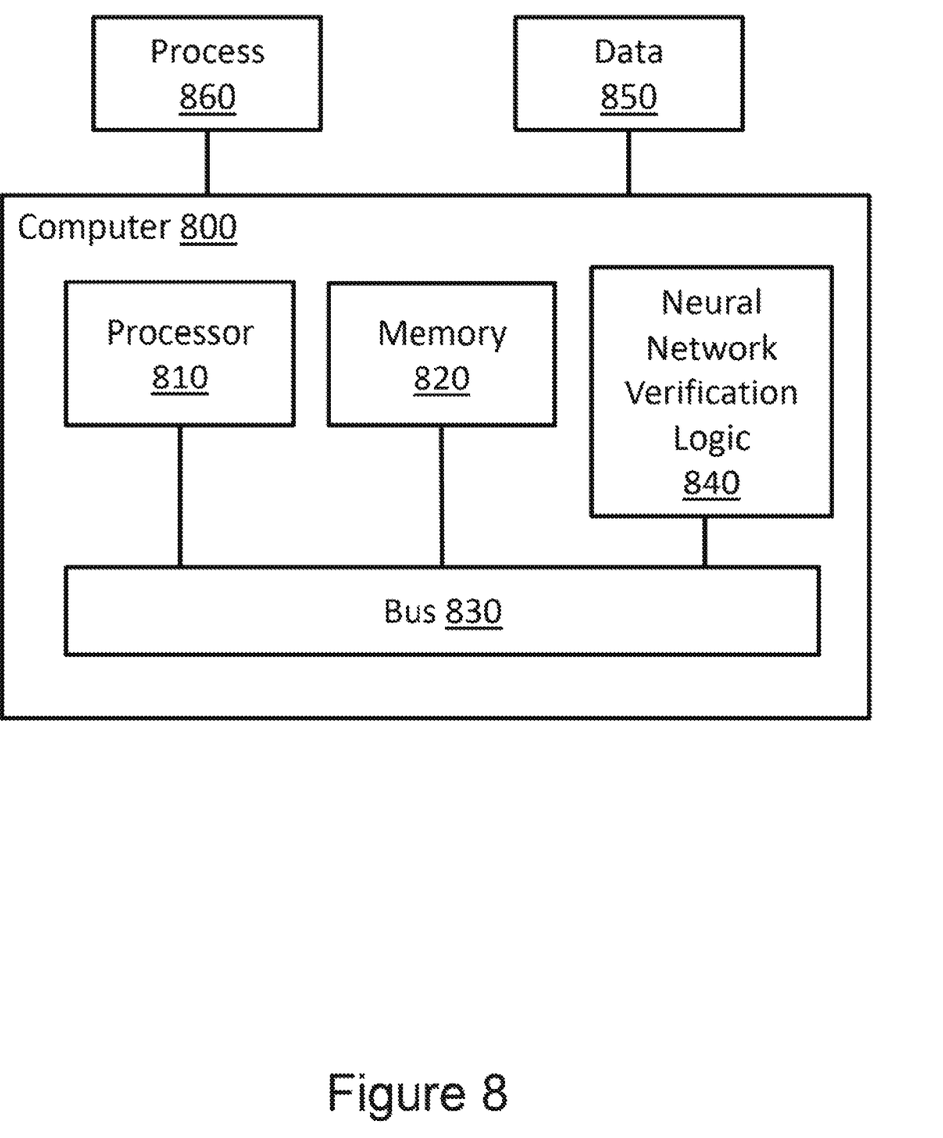
FIG. 8 illustrates an example computing device in which example systems and methods, and equivalents, may operate.

FIG. 8 illustrates an example computing device in which example systems and methods, and equivalents, may operate. The example computing device may be a computer 800 that includes a processor 810 and a memory 820 connected by a bus 830. The computer 800 includes a neural network verification logic 840. In different examples, neural network verification logic 840 may be implemented as a non-transitory computer-readable medium storing computer-executable instructions in hardware, software, firmware, an application specific integrated circuit, and/or combinations thereof.

The instructions may also be presented to computer 800 as data 850 and/or process 860 that are temporarily stored in memory 820 and then executed by processor 810. The processor 810 may be a variety of various processors including dual microprocessor and other multi-processor architectures. Memory 620 may include volatile memory (e.g., read only memory) and/or non-volatile memory (e.g., random access memory). Memory 820 may also be, for example, a magnetic disk drive, a solid state disk drive, a floppy disk drive, a tape drive, a flash memory card, an optical disk, and so on. Thus, Memory 820 may store process 860 and/or data 850. Computer 800 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to:

train a neural network with a training data set to perform a predefined task;

train the neural network with a sentinel data set, where the sentinel data set causes the neural network to provide an identification signal in response to a predefined query set;

provide the predefined query set, the identification signal, and access to the neural network to a trusted third party, where the trusted third party confirms whether the predefined query set, the identification signal, and the neural network conflict with an archived query set, an archived identification signal, and an archived neural network, and where the trusted third party confirms whether the neural network provides the identification signal in response to the predefined query set;

verify whether a suspicious service operates an unauthorized copy of the neural network by extracting the identification signal from responses the suspicious service provides upon receiving the predefined query set; and receive a confirmation from the trusted third party when the suspicious service operates the unauthorized copy of the neural network.

2. The non-transitory computer-readable medium of claim 1, where the instructions further cause the computer to:

enhance the identification signal with an error correcting code, where the error correcting code inhibits modifications to the unauthorized copy of the neural network by causing the suspicious service to provide a non-matching identification signal in response to the predefined query set.

3. The non-transitory computer-readable medium of claim 1, where extracting the identification signal comprises hiding the predefined query set within a masking query set to prevent an operator of the suspicious service from identifying the predefined query set.

4. The non-transitory computer-readable medium of claim 1, where the sentinel data set is uncorrelated with the training data set.

5. The non-transitory computer-readable medium of claim 4, where the sentinel data set comprises randomly generated inputs.

6. The non-transitory computer-readable medium of claim 1, where the neural network topology is designed to accommodate the sentinel data set to prevent under-fitting the neural network.

7. The non-transitory computer-readable medium of claim 1, where the trusted third party verifies whether the suspicious service operates the unauthorized copy of the neural network by extracting the identification signal from responses the suspicious service provides to the predefined query set.

8. A computing system, comprising:

a processor;

a training logic to train a neural network according to a training data set to perform a predefined task;

a neural network security logic to train the neural network according to a first sentinel data set, creating a first secured neural network, where the first sentinel data set causes the first secured neural network to provide a first identification signal in response to a first predefined query set;

logic to provide the first predefined query set, the first identification signal, and access to the neural network to a trusted third party, where the trusted third party confirms whether the predefined query set, the identification signal, and the neural network conflict with an archived query set, an archived identification signal, and an archived neural network, and where the trusted third party confirms whether the neural network provides the identification signal in response to the predefined query set;

an embedding logic to embed the first secured neural network into a first unsecured device;

a verification logic to identify whether a suspicious service operates an unauthorized copy of the neural network by extracting the first identification signal from responses the suspicious service provides to the first predefined query set; and logic to receive a confirmation from the trusted third party when the suspicious service operates the unauthorized copy of the neural network.

9. The system of claim 8,
where the neural network security logic also trains the neural network according to a second sentinel data set, creating a second secured neural network, where the second sentinel data set causes the second secured neural network to provide a second identification signal in response to a second predefined query set;
where the embedding logic embeds the second secured neural network into a second unsecured device; and
where the verification logic identifies whether the suspicious service operates the unauthorized copy of the neural network by extracting the second identification signal from a response the suspicious service provides to the second predefined query set.

10. The system of claim 9, where the suspicious service providing the first identification signal in response to the first predefined query set indicates the unauthorized copy of the neural network was copied from the first unsecured device, and where the suspicious service providing the second identification signal in response to the second predefined query set indicates the unauthorized copy of the neural network was copied from the second unsecured device.

11. The system of claim 8, comprising an error correction logic to embed an error correcting code into the first secured neural network, where the error correcting code inhibits modifications to the unauthorized copy of the neural network that affect the provision of the first identification signal in response to the first predefined query set.

12. The system of claim 8, where the first unsecured device is associated with one or more of a person, an instance of a service, and a company.

* * * * *